Jan. 21, 1964     C. GAGNIERE     3,119,049
PROTECTION DEVICE FOR ELECTRIC NETWORKS
Filed Jan. 20, 1959     4 Sheets-Sheet 2

INVENTOR
Claude Gagniere
By Karl W. Flocks
ATTORNEY

Jan. 21, 1964  C. GAGNIERE  3,119,049
PROTECTION DEVICE FOR ELECTRIC NETWORKS
Filed Jan. 20, 1959  4 Sheets-Sheet 3
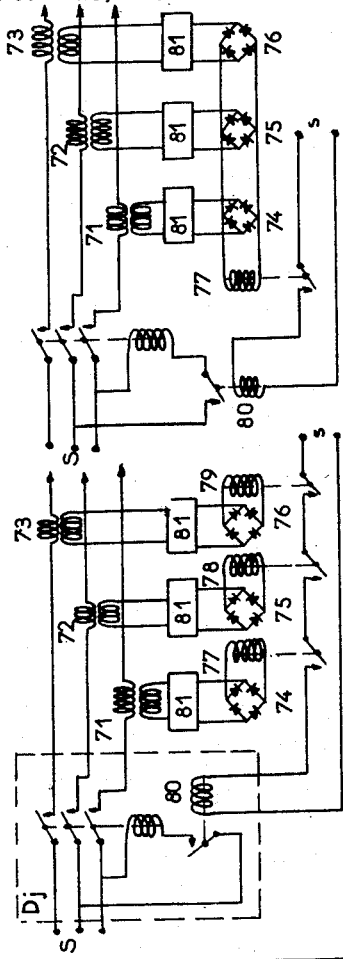
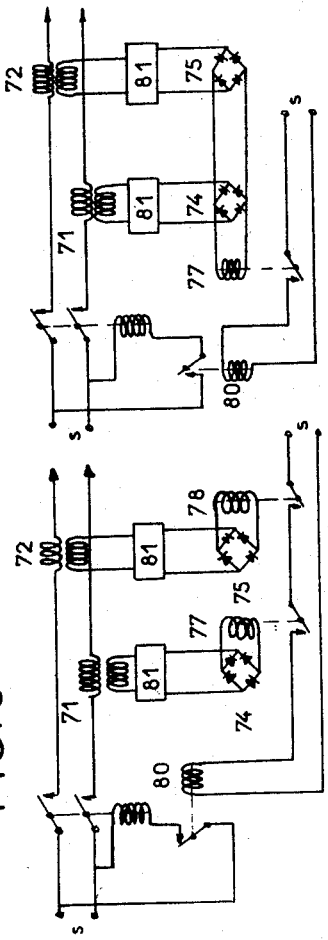
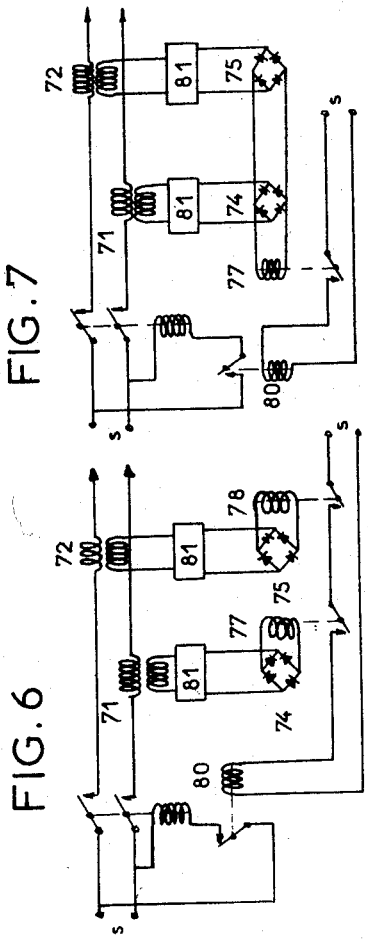
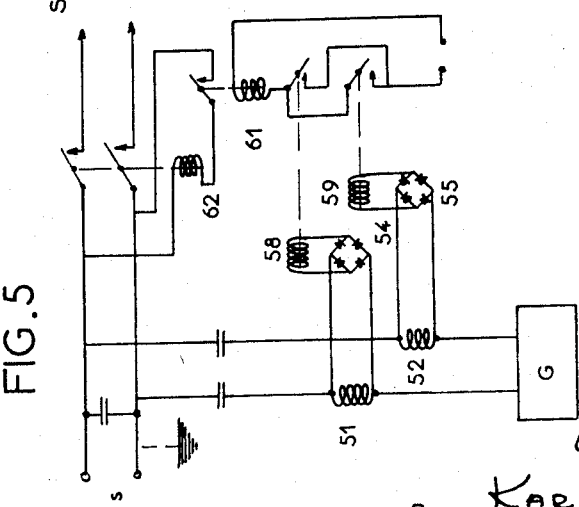
INVENTOR
Claude Gagniere
By Karl W. Flocks
ATTORNEY Jan. 21, 1964   C. GAGNIERE   3,119,049
PROTECTION DEVICE FOR ELECTRIC NETWORKS
Filed Jan. 20, 1959   4 Sheets-Sheet 4

INVENTOR
*Claude Gagniere*

By   KARL W. FLOCKS
ATTORNEY

United States Patent Office 3,119,049
Patented Jan. 21, 1964

3,119,049
PROTECTION DEVICE FOR ELECTRIC NETWORKS
Claude Gagniere, Creil, France, assignor to Charbonnages de France, Paris, France, a public institution of France
Filed Jan. 20, 1959, Ser. No. 787,973
Claims priority, application France Mar. 25, 1958
5 Claims. (Cl. 317—9)

This invention relates to a new type of protection device against short circuits in industrial power networks.

Protection against short circuits is usually provided for by so-called current relays, which are adapted to switch off the current in case of an excess load. But the setting of the relay working current must be high enough to enable the motors to be started without any untimely switching off action. As the starting current of certain motors can be five or six times higher than their rated current, the current caused by a resistant short-circuit will sometimes be of a lower value than the working current intensity of the current relays. In industrial practice, there are numerous instances of incidents or accidents occurring because of failures in current relays, as the dangerous short-circuit appears with a non-negligible impedance (charring of an insulator, bringing into contact of two phases with the semi-conductive sheath of a flexible cable). Arc resistance, added to the line resistance, can even reduce the current intensity of a short-circuit to a lower value than that of the working current of timed protection devices against overloads.

In order to decrease the aforementioned danger, certain rules and practices provide that the plain short-circuit current which is liable to appear at any point, should be much higher than the working current for which the protection device operates. Other rules prescribe the use of insulation control-boxes between the phase and the earth. Without enumerating all these prescriptions and their respective drawbacks, it is obvious that if they reduce the frequency of dangerous incidents, some of them increase the frequency of untimely switching off of the current, which leads the operators to neutralise these protection devices. At the same time, the accidents, which still may occur, are oftentimes more serious.

There will now be disclosed a protection device against all short-circuit currents, even those of high impedance, which involves no risk of causing an untimely switching-off of the current during normal operation of the network. This device can be readily adapted to all electric networks, whatever their coverage and whatever their power, as it will always be possible to exercise a control, by holding the high frequency injection current at a very low intensity under all conditions of normal operation, whereas, in all cases where a short-circuit occurs, even if it remains resistant, a detectable current will immediately flow in relation to this high frequency. Such results cannot be achieved by the known devices, which generally embody cumbersome rotary machines, developing a high power, leading to a low sensitivity and restricting their use to networks of limited power.

The object of the present invention is to overcome these drawbacks and to provide a protection device for electric networks against short-circuits in networks comprising energy consuming equipment requiring a high starting current, in particular motors, said device being based on the fact that with frequencies much higher than the industrial frequency, the very inductive impedance of receivers connected to the network increases proportionally to the frequency, while the not very inductive impedance of short-circuit arcs and lines remains low, and in which an alternative frequency voltage much higher than the frequency of the network is injected thereinto, said injection being effected through a set of series-connected reactors-capacitors tuned to the injection frequency.

The invention is also concerned with a method for the protection of electric networks against short-circuits occurring in networks comprising energy-consuming components requiring a high starting current, in particular motors, wherein an alternative voltage of much higher frequency than the frequency of said network is injected thereinto, the injection being effected through a series-connected set of reactors-capacitors tuned to the injection frequency, by means developing under normal operational conditions only a very low power, said means injecting the high-frequency alternative control voltage, means placed between the phases in parallel with the reactors of said network power supply forming with said reactors an assembly tuned to the frequency of the injected control voltage to limit the power of the generator and means actuating cut-off units controlling the network, in case of a short-circuit, the setting of the protection relays, controlled by said cut-off unit actuating means, remaining effective whatever the power of the receivers by placing means so calculated as to form with the reactors of the receivers a high-impedance circuit for the injection frequency, at the terminals of the receivers or of a unit comprising several parallel-mounted receivers.

According to another feature of the invention, the protection device proper of the network comprises fault detectors, some of which provide an overall protection through being associated with the high frequency generator, while the others provide a selective protection of the beginning of the lines on which they are mounted, all these detectors being fed by current transformers, the primaries of which are series-connected to each of the conductors forming the beginning of the whole line or the beginning of the individual lines involved, said transformers being connected to bridge-connected rectifiers through frequency filters eliminating the basic frequency of the network and the disturbing harmonics, the rectifiers being in turn connected to individual or parallel-connected relays for feeding a common relay.

The detectors providing for overall protection can likewise be fed by drawing the voltage across reactances which are series-connected to the connections between the frequency generator and the network, or from the secondaries of current transformers, the primaries of which are series connected to the former connections, the reactors or these primaries forming with the capacitors of these connections resonance circuits for the injection frequency.

According to one possible embodiment, the network is protected at several points, by protecting first every connection by an instantaneously operating switch-off assembly, then by protecting in succession the beginning of the main line and the beginning of the various secondary lines by means of timed switch-off members, the timing increasing in the upstream direction.

Thus, the device according to the invention offers the advantage of giving a possibility to the operator of either controlling the network from a central point or selectively controlling the beginning of each secondary line by means of a series-protection including a time delay of the foremost relays, through the simple addition of a condenser. It is also to be noted that the device according to the invention can be adapted either to a transformer-fed network or to a network fed by a rotary machine, the only characteristics of the main network which has to be taken into consideration for said adaptation being the reactance of the power supply in relation to the generator terminals.

Other advantages and features of the device according to the invention will become clear on reading the following description with reference to the accompanying drawings, in which:

FIGURES 2, 3, 4, 5 and 12 show the connection of the detectors on the connecting line between the high-frequency generator and the network in the case of a single phase network or a continuous current or three phase network;

FIGURES 6, 7, 8, 9 and 11 show various embodiments for the connection of the detectors;

Figure 1:
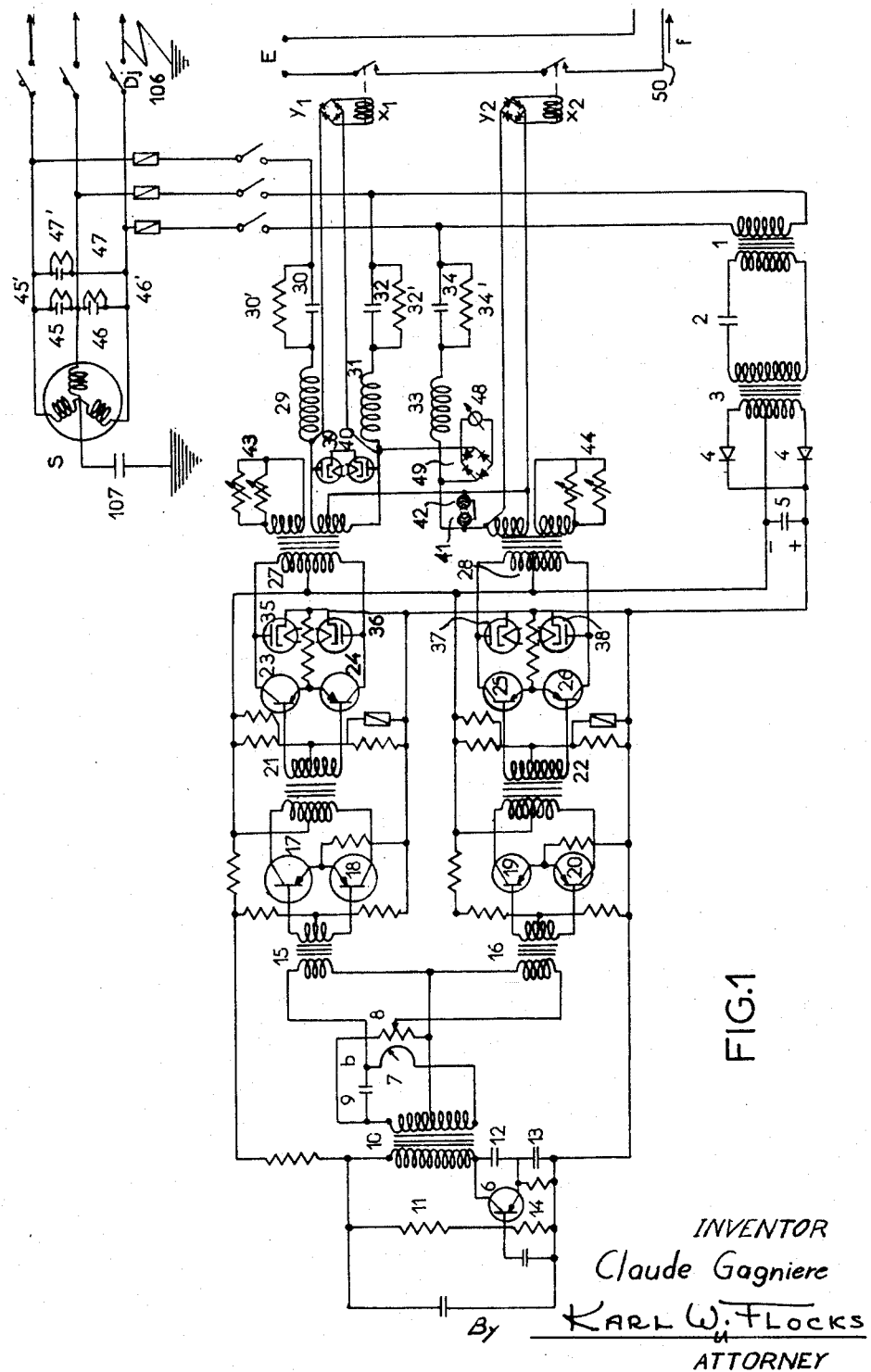
FIGURE 1 is a diagram of a high-frequency transistor generator.

The control frequency generator shown in FIGURE 1 can be equipped either with transistors or with electron tubes. In either case, the connection diagram is the one shown in FIGURE 1, illustrating one of the possible embodiments for the control of a three-phase network.

The aforesaid generator G comprises a D.C. supply, an oscillator and a two-channel-amplifier unit.

The D.C. feed consists of a step-down transformer 1, a ferro-resonant voltage control unit comprising a condenser 2 series-connected with the primary of a saturated transformer 3, two diodes 4 forming with the transformer-secondary a bivalve connection supplying the terminals of the filtering capacitor 5 with a two half-cycle rectified voltage.

The transistor-equipped oscillator 6 of a conventional design generates a low high-frequency voltage which is higher than that of the harmonics of the fifteenth order of the network basic frequency. Preferably, this frequency will be selected higher than 3000 cycles per second for a network of 50 cycles per second.

When the high frequency is to be injected into a three-phase network, the generator is coupled to the network by means of Scott-connected transformers. In order that the angle of phase difference between the three phases of the high frequency injection arrangement into the network be less sensitive to the load, it is preferred, prior to amplification, to effect an angular displacement by 90° of both component voltages. This is why the signal emitted by the frequency generator 6 is angularly displaced by 90° while it is still weak before being injected into two parallel stages of amplification, each of which controls one of the two elements of the primary of the Scott connection.

The coupling arrangement between the oscillator and both amplification stages comprises a coupling transformer 10, an assembly consisting of a rheostat 7, a potentiometer 8 and a capacitor 9, enabling both amplification chains to be acted upon by voltages $U_0$ and $U_0'$ at the primary of the coupling transformers 15 and 16, angularly displaced in relation to each other by 90° and the amplitude ratio of which varies with the gain of both amplification-stages. The adjustment of the angular displacement between voltages $U_0$ and $U_0'$ and of their amplitude ratio is achieved by means of the rheostat 7 and of the potentiometer 8. The variation of the rheostat 7, while leaving constant the amplitude of the voltage vector of voltage $U_0$ across the primary terminals of the transformer 15, causes it to rotate in relation to the voltage vector of voltage $U_{1.0}$ at the secondary terminals of the transformer 10. The potentiometer 8 enables the amplitude of the voltage vector of voltage $U_0'$ at the terminals of the primary of the transformer 16 to be varied, while leaving constant its angle of phase difference with the voltage vector of voltage $U_{1.0}$.

Both amplification-stages proper each comprise a coupling transformer 15, 16, a first amplification stage formed by two power transistors connected in push-pull 17, 18 and 19, 20, a second amplification stage connected to the first by coupling transformers 21, 22 and comprising two power transistors connected in push-pull 23, 24 and 25, 26, and two output transformers 27, 28, the secondaries of which are Scott-connected. One end of the secondary of transformer 28 is connected to the median point of the secondary of transformer 27. The $U_2$ voltage of the secondary of transformer 28 is angularly displaced by 90° in relation to the voltage $U_1$ of the secondary of transformer 27. The ratio of both these voltages is $$\frac{U_1}{U_2} = \frac{2}{\sqrt{3}}$$

It follows that between the three terminals formed by both ends of the secondary of transformer 27 and the free end of transformer 28, there appear three balanced voltages, which are angularly displaced by 120° in relation to one another.

The coupling between the generator and the network is effected by means of series reactor-capacitor circuits 29—30, 31—32, 33—34 tuned to the generator frequency and thus having their minimum impedance for said frequency. Resistors 30'—32'—34' across capacitors 30—32—34 are provided for their discharge immediately upon switching-off.

Protection against excess voltages which appear when the connection with the network is established, is provided for either separately or simultaneously by the following devices: diodes 35—36, 37—38, diodes with Zener effect 39—40, 41—42, varistors 43 and 44 connected across an overvoltage winding of the output transformers 27 and 28. One of these methods of protection or a combination thereof is preferable to the protection by neon glow lamps, which has the drawback of not having a stable priming potential and of having an extinction potential lower than the priming potential. Two relays $X_1$ and $X_2$ fed by rectifiers $Y_1$ and $Y_2$ are connected across the terminals of the secondaries of the transformers 27 and 28. In case of a failure in one or in both amplification-stages, relays $X_1$ or $X_2$ or $X_1$ and $X_2$ are de-energised and caused either the operation of a warning device or the operation of the circuit-breaker Dj, thus breaking the circuit 50 connecting the voltage source E to said warning device or to the switching-off device of the detector unit connected up in the direction of arrow f.

In order to control an extensive network with a very low-powered generator, i.e. an electronic generator, it is desirable to increase the source impedance. This result is achieved by means of a set of capacitors 45, 46, 47 placed across the source terminals and forming with the reactors thereof a tuned parallel circuit having its maximum impedance for the injection frequency F.

For the same reasons, it can be desirable to increase the control possibility of ... the generator in the case of a high-powered network, by increasing the impedance of the motors fed therewith. In order that the adjustment of the relays should remain effective whatever be the power of the receivers, it is sufficient to place at the terminals thereof or on a parallel connected assembly of several receivers, capacitors computed so as to form with the reactors in the receiver a parallel reactor-capacitor circuit of high impedance for a given frequency F.

When a single-phase network has to be controlled, the injection of the control frequency emitted by the oscillator 6 will be effected through a single amplification chain, both terminals of the output transformer being connected in the network by means of tuned reactor-capacitor circuits.

The generator comprises a voltmeter 48 fed through a rectifier 49 and connected between two phases between the output transformers and the filtering reactances. The indications provided thereby enable the anti-resonant circuit comprising the power-supply reactors and the capacitors 45, 46, 47 to be tuned.

If a switching-off apparatus is connected between the power supply and capacitors 45, 46, 47, discharge resistors 45', 46' and 47' are associated with these capacitors, operating at the times when the main circuit is switched off, when the switching-off apparatus is operated.

FIGURES 2 to 11 show various embodiments and connections of the detectors which are adapted to cut-off the current on the supply line in case of a short circuit.

Figure 3:
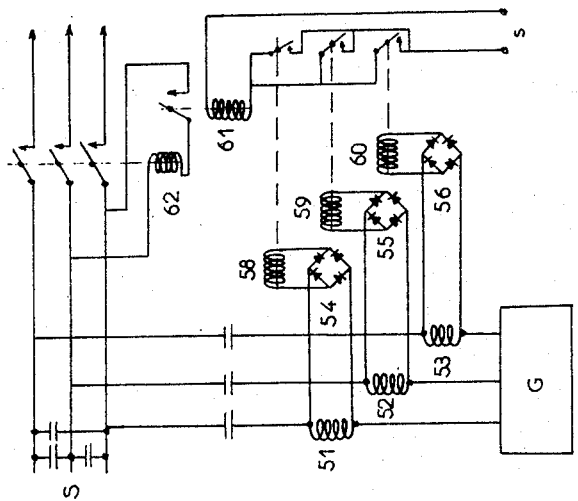
Figure 2:
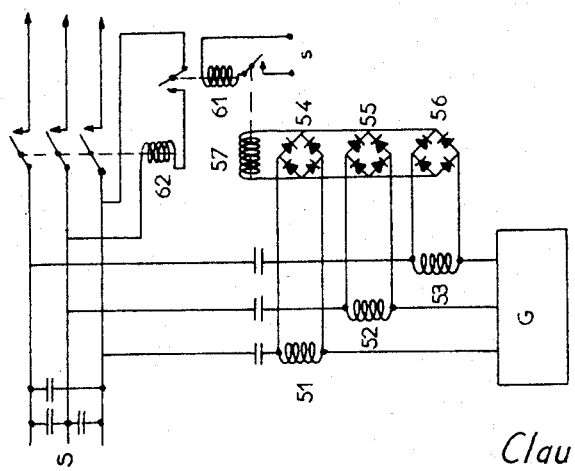
Figure 12:
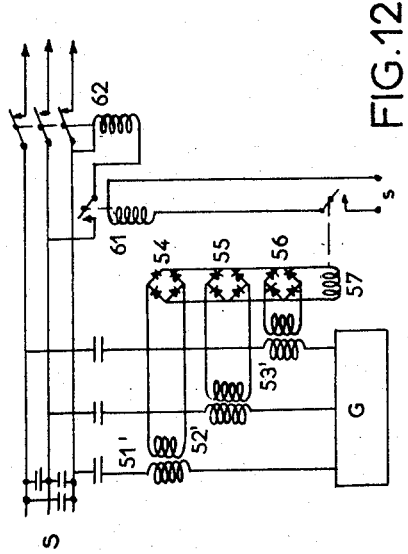

FIGURES 2 to 5 and 12 show embodiments of a detector associated with the generator G, the detectors shown in these figures having as their main feature to control directly the intensity of the current having a frequency F absorbed by the network as a whole at the generator terminals. FIGURES 2, 3 and 12 relate to the protection of a three-phase network, while FIGURES 4 and 5 relate to the protection of an A.C. single-phase or a D.C. network, with or without an earthed pole.

Figure 4:
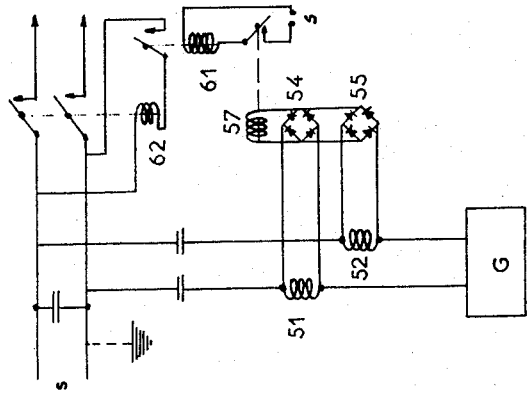

In FIGURES 2 to 5, the detector is fed by drawing voltage at the terminals of the reactances 51, 52, 53 (FIGS. 2 and 3) and 51, 52 (FIGS. 4 and 5) forming the connection between the frequency generator and the network. Since the reactor-capacitor connecting circuit between the generator and the network is resonant for the injection frequency F, the voltage across the reactor, which is proportional to the current, will have a minimum weakening for the frequency F. The weakening of the basic frequency and of the disturbing harmonics will be sufficient so as not to require any additional filtering device. The voltages across the reactor terminals are rectified by the rectifiers 54, 55, 56 (FIGURES 2 and 3) and 54, 55 (FIGURES 4 and 5). These rectifiers feed either separately an individual relay 58, 59, 60 (FIGURE 3) and 58, 59 (FIGURE 5), or, being parallel-connected, a common relay 57 (FIGURES 2 and 4).

This relay or these relays, operating either directly, or through an auxiliary relay 61, cut-off the feed of a low voltage protection coil 62 of a circuit-breaker, or the coil of a contactor, or cut-off the feed of the current-emitting coil of a circuit-breaker. In all the cases considered hereabove, the reactance coils 51, 52, 53 or 51, 52 can be replaced by transformers 51', 52', 53' (FIGURE 12) with or without an iron-core, the primaries of which have the same reactances as the coils and form with the coupling capacitors between the generator and the network resonant circuits for the frequency F. The rectifiers are then fed by the secondaries of these transformers.

FIGURE 12 shows such an embodiment adapted for the protection of a three-phase circuit having a common relay 57.

In all the earlier described embodiments, some or all of the relays can be replaced by transistors, operating singly or forming a flip-flop arrangement.

Figure 13:
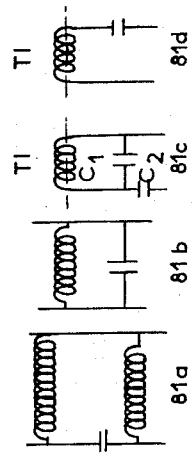
FIGURE 13 shows four embodiments of filters used in the detectors.
Figure 10:
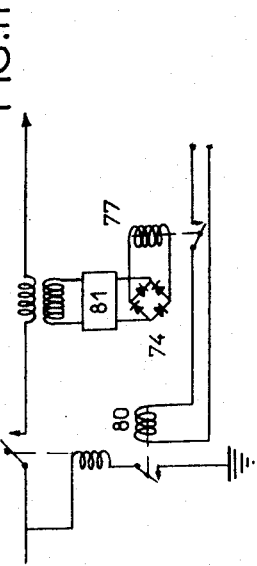

In FIGURES 6 to 10, there are shown various detector circuits providing either a general protection, as in the former case, or a selective protection of the start of the line on which they are mounted. They comprise a feed achieved by means of current transformers 71, 72, 73 (FIGURES 6 and 7), 71, 72 (FIGURES 8 and 9), 71 (FIGURE 10). Every transformer supplies a bridge rectifier 74, 75, 76 (FIGURES 6 and 7), 74, 75 (FIGURES 8 and 9), 74 (FIGURE 10) by means of a filter 81 eliminating the basic frequency of the network and the disturbing harmonics. FIGURE 13 shows four embodiments of such filters, a high-pass filter 81a, a resonant filter 81b, a filter 81c consisting of two condensers C1 and C2, one of them (C1) being connected in parallel on the secondary of the current transformer and forming therewith a circuit tuned to the frequency F, the other (C2) being series-connected with the current transformer and eliminating the basic frequency and disturbing harmonics, and finally a filter 81d consisting of a condenser series-connected with the secondary of the current transformer and forming therewith a circuit tuned to the frequency F. Amongst these connecting arrangements, it is to be noted that the high-pass filter 81a, besides the frequency F current which is generated at the time of the fault, allows the passage of high frequency harmonics generated with the arc, whereby the sensitiveness of the device is increased. The rectifiers feed separately an individual relay 77, 78, 79 (FIGURE 6), 77, 78 (FIGURE 8), 77 (FIGURE 10), or are connected in parallel, and feed a common relay 77 (FIGURES 7 and 9). This relay or these relays, operating either directly or through an auxiliary relay 80, cut-off the feed of the low voltage protection coil of a circuit breaker or the coil of a contactor, or close the current-emitting coil of a circuit-breaker.

Figure 11:
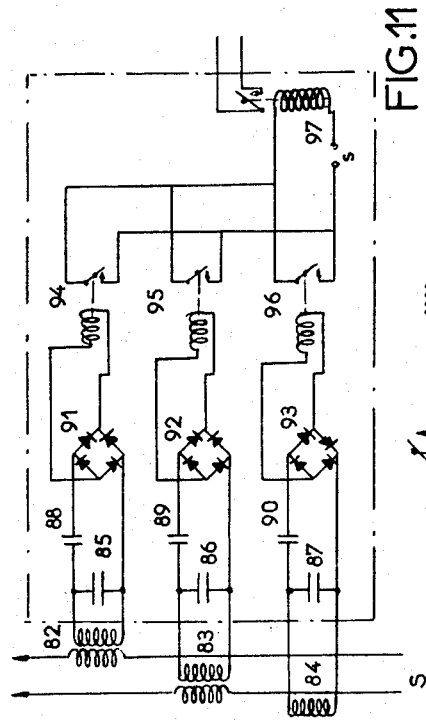

According to the embodiment shown in FIGURE 11, the detector is fed through current transformers with or without cores, 82, 83, 84 at the terminals of which are arranged capacitors 85, 86, 87 forming with the secondaries of the current transformers parallel circuits tuned to the injection frequency F and having for that frequency a maximum voltage at their terminals.

The object of the capacitors 88, 89, 90 is to eliminate the basic frequency and the disturbing harmonics.

The two half-cycles of the obtained voltages are rectified by rectifiers 91, 92, 93 which feed relays 94, 95, 96. These relays, through an auxiliary relay 97, cut off the supply of the low-voltage protection coil of a circuit-breaker or the coil of a contactor, or close the supply of the current-emitting coil of a circuit-breaker.

In all the described embodiments, some or all relays can be replaced by transistors operating alone or forming a flip-flop arrangement.

This new device is very advantageous in that its operation and adjustment can be checked at any time, by connecting to any point of the network and between two phases, a circuit comprising a reactor, a capacitor and a variable resistor R connected in series. With such an arrangement, the reactor-capacitor unit which is tuned to the injection frequency F, will have for that frequency a negligible impedance; thus the value of the circuit impedance, which is very high for the frequency of the network, is equal to that of the variable resistance R for the current having a frequency F. It becomes thus possible to control at any given moment the value of R corresponding to the operation of the device.

The device according to the invention operates as follows: A weak current having the selected frequency, limited by the line resistance, but chiefly by the impedance of the motors, is flowing in every connection of the consumer circuit. A much larger current is generated in the portion of the circuit comprising the power source S, the transformer or rotary machine, the impedance of which in relation to the reactances is low compared to that of the motors. In order to limit the power of the generator G, the latter current is decreased by placing a set of capacitors 45, 46, 47 (FIGURE 1) in a triangular or star arrangement on the three phases, their value being such that the assembly formed by the reactors of the power supply and the capacitors 45, 46, 47 constitutes a parallel circuit tuned to the F frequency emitted by the generator G.

At the main start of the network and at every secondary start, there is a unit of short-circuit detectors, consisting of current transformers 71, 72, 73 feeding the relays 77, 78, 79 through frequency filters 81 (FIGURE 6). These filters eliminate the basic frequency (usually 50 periods per second) and the disturbing harmonics thereof.

Under normal operating conditions, the current of frequency F which passes through the current transformers is not sufficient to energize the relays 77, 78, 79 which control the circuit-breaker Dj, but should a short circuit occur, even a strongly resistant one (i.e. 10 ohms), the current of frequency F becomes larger than the current required for the energizing of relays 77, 78, 79, the operation of which results in the actuating of the switching-off apparatus Dj (FIGURE 6).

When the filters 81 are high-pass filters, the action of the F frequency-current which arises with the short-circuit, is reinforced in case of an arc formation (which is mostly the case), by current harmonics of a fairly high order generated by said arc. The order of the harmonics generated by the arc can even be sufficient, in case the latter is of fairly high intensity, to actuate the relays; however, it is not possible to rely only on the arc-generated harmonics to provide for the protection against short circuits as, in some cases, there may occur a flame without sizable arcing; this is for example the case, at least during the initial stage, of an inter-phase shorting through the semi-conductive rubber of a flexible cable.

The device according to the invention can also be used to protect the network against plain faults between phase and earth. It is sufficient to add a capacitor 107 between the neutral of the power supply S and the earth (FIGURE 1). Thus, the circuit from the generator G is closed by an eventual fault 106 and the capacitor 107, and causes the energization of the nearest relays 77, 78, 79, which is immediately upstream and on the phase affected by the fault 106. In that case, the circuit-breaker Dj controlled by the relays, cuts off the current on the portion of the line where the leakage has taken place. The positioning, either between the neutral of the power supply S and the earth, of a capacitor which constitutes a tuned circuit with each of the three reactors forming said power supply, or between each phase and the earth, of a circuit consisting of a capacitor and a reactor and tuned to the injection frequency, provides a protection against an inadequate insulation between the phases and the earth.

Tests carried out by the applicant have shown, for example, that it was possible, with the device according to the invention, to provide for protection against short-circuits between two phases, the intensity of which was of about 20 amperes under 550 volts, this corresponding to a 25 ohms resistance for the line plus the short-circuit resistance, while the total starting current for the motors was about 1000 amperes. This new type of protective relays thus provides increased safety, but also enables economies to be made in connection with the sections of the cables and as regards the number of protection devices used.

It is to be understood that this invention has just been described and illustrated merely by way of explanation, without any intent of limiting the same, and that various alterations of detail can be made therein without falling outside its scope.

What I claim is:

1. Protective apparatus against short circuits occurring between conductors of the network or of the power source for electrical networks with an energy-consuming equipment load requiring a high starting current, particularly motors, comprising means to inject a high-frequency alternative control voltage of much higher frequency than the frequency of the network into the electrical network, said injection means developing only a very low power under normal operational conditions, a series connected set of reactors-capacitors tuned to the frequency of the high frequency alternative control voltage through which the injection of the high frequency alternative control voltage into the network is effected, means placed between the phases of the network power supply and in parallel with the reactors of the network power supply, said last named means and the reactors of the network power supply forming an assembly tuned close to the frequency of the injected control voltage thereby allowing a limited amount of the control voltage in the network power supply, and detector means to actuate cut-off units controlling the electrical network in case of a short-circuit occurring between conductors of the network or of the power source, means forming with the reactors of the energy-consuming equipment load a high impedance circuit for the injected control voltage at the terminals of the load whereby the setting of protection relays controlled by said means to actuate cut-off units remains effective whatever the power of the energy-consuming equipment load.

2. Protection device for electric networks according to claim 1, wherein said means placed between the phases comprises a set of capacitors connected in parallel with the reactors of the network power supply, seen from the terminals of the means to inject a high frequency alternative control voltage, said capacitors and said reactors forming an assembly tuned close to the frequency of the injected control voltage.

3. Protection device for electric networks according to claim 1, wherein said detector means to actuate the cut-off units in case of short-circuits comprises current detectors, detecting the faults occurring in the network, some of which provide a general protection through being associated to said means to inject a high frequency alternative control voltage, while the others provide a selective protection of the branch lines on which they are mounted, either detectors being fed by current transformers, the primaries of which are series-connected to each of the conductors forming the mains and the branch lines, said transformers being connected to bridge-connected rectifiers through frequency filters eliminating the basic frequency of the network and the disturbing harmonics, the rectifiers being in turn connected to individual relays or parallel-mounted to feed a common relay.

4. Protection device for electric networks according to claim 3, wherein the current detectors for general protection are fed by tapping the voltage at the terminals of reactors series-connected to the connections between said means to inject a high frequency alternative control voltage and the network, the voltage applied to these reactors, which is proportional to the current, having then a minimum loss at the frequency of the injected control voltage, the reactors forming with the capacitors of these connections resonant circuits for the injection frequency.

5. Protection device for electric networks according to claim 3, wherein the current detectors for the general protection are fed from secondaries of current transformers, the primaries of which are series-connected to connections between said means to inject a high frequency alternative control voltage and the network, said primaries forming with the capacitors of these connections resonant circuits for the injection frequency.

References Cited in the file of this patent

UNITED STATES PATENTS

| | | |
|---|---|---|
| 1,831,338 | Brown | Nov. 10, 1931 |
| 1,871,724 | Moss | Aug. 16, 1932 |
| 2,896,126 | Hoff | July 21, 1959 |